July 26, 1949.
J. H. HARDING
GENERALLY KNOWN AS
H. J. HARDING
LOOM FOR WEAVING PATTERNED PILE FABRICS
Filed Oct. 29, 1946
2,477,249
14 Sheets—Sheet 1
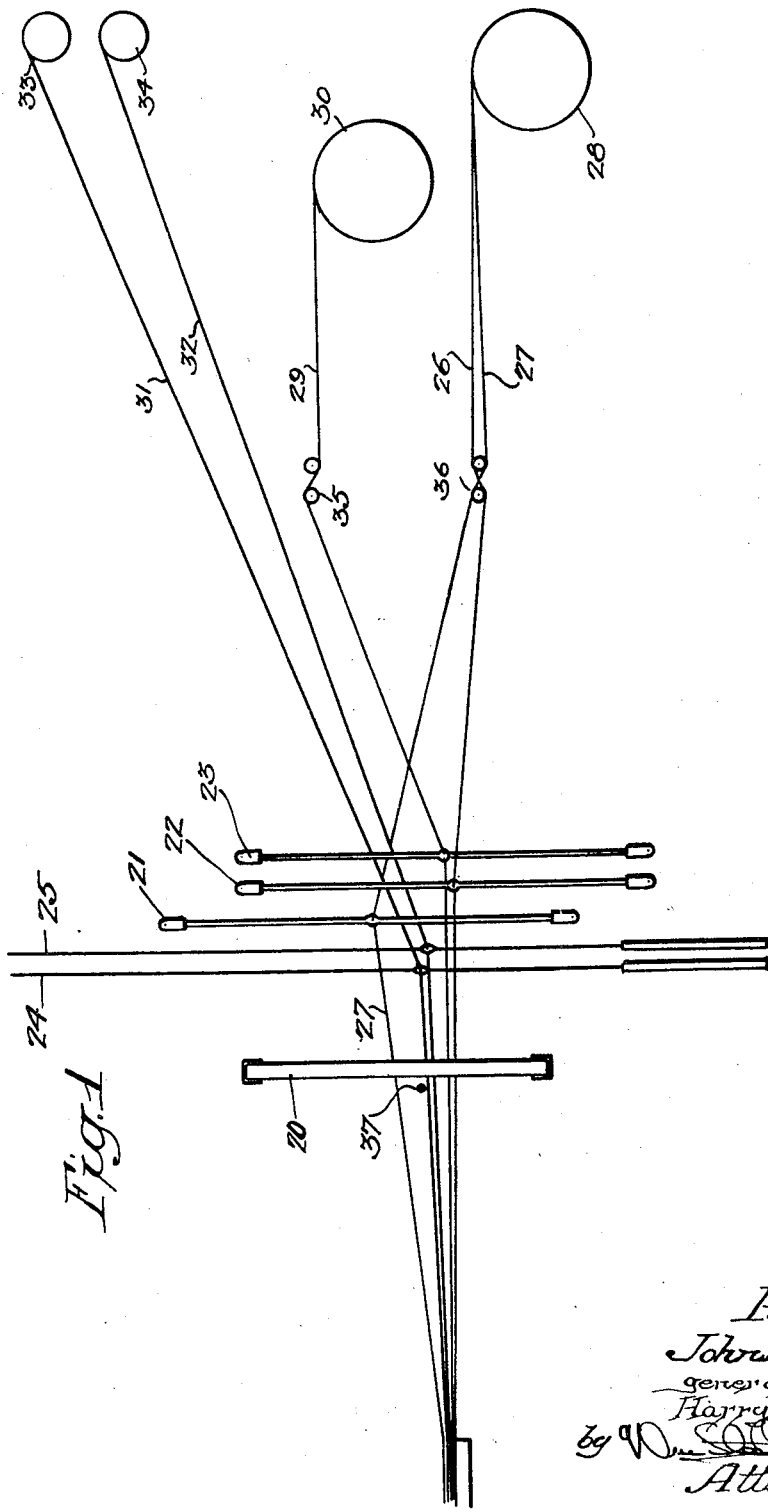
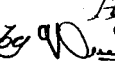

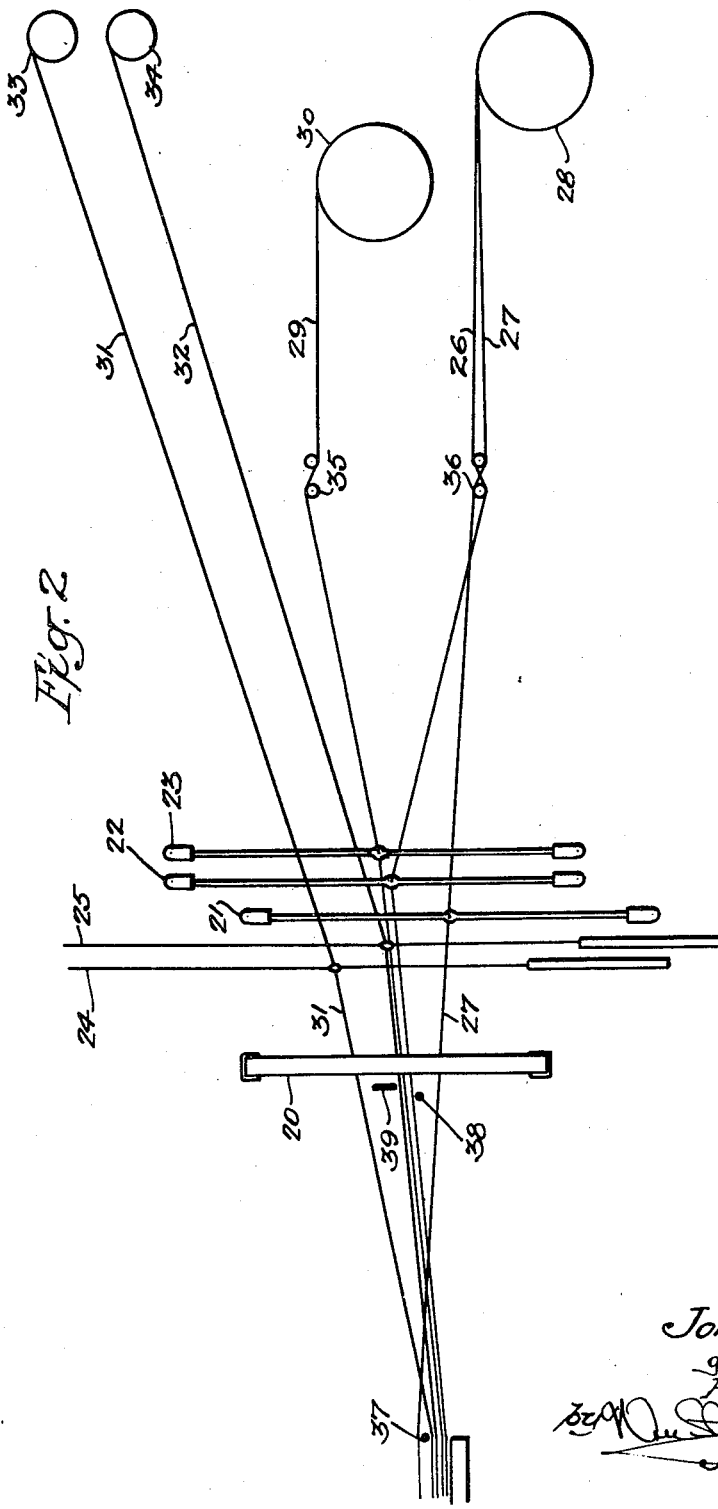

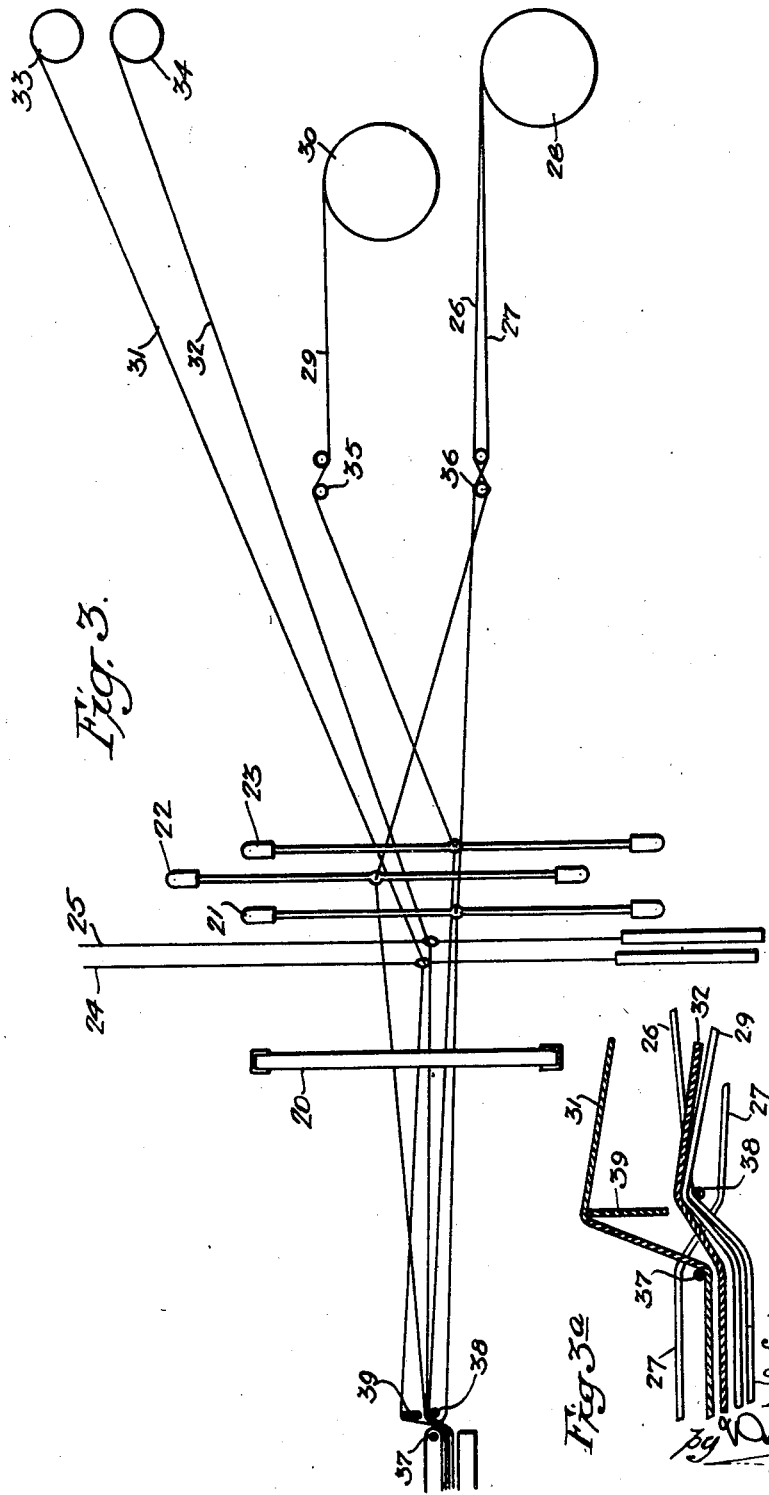

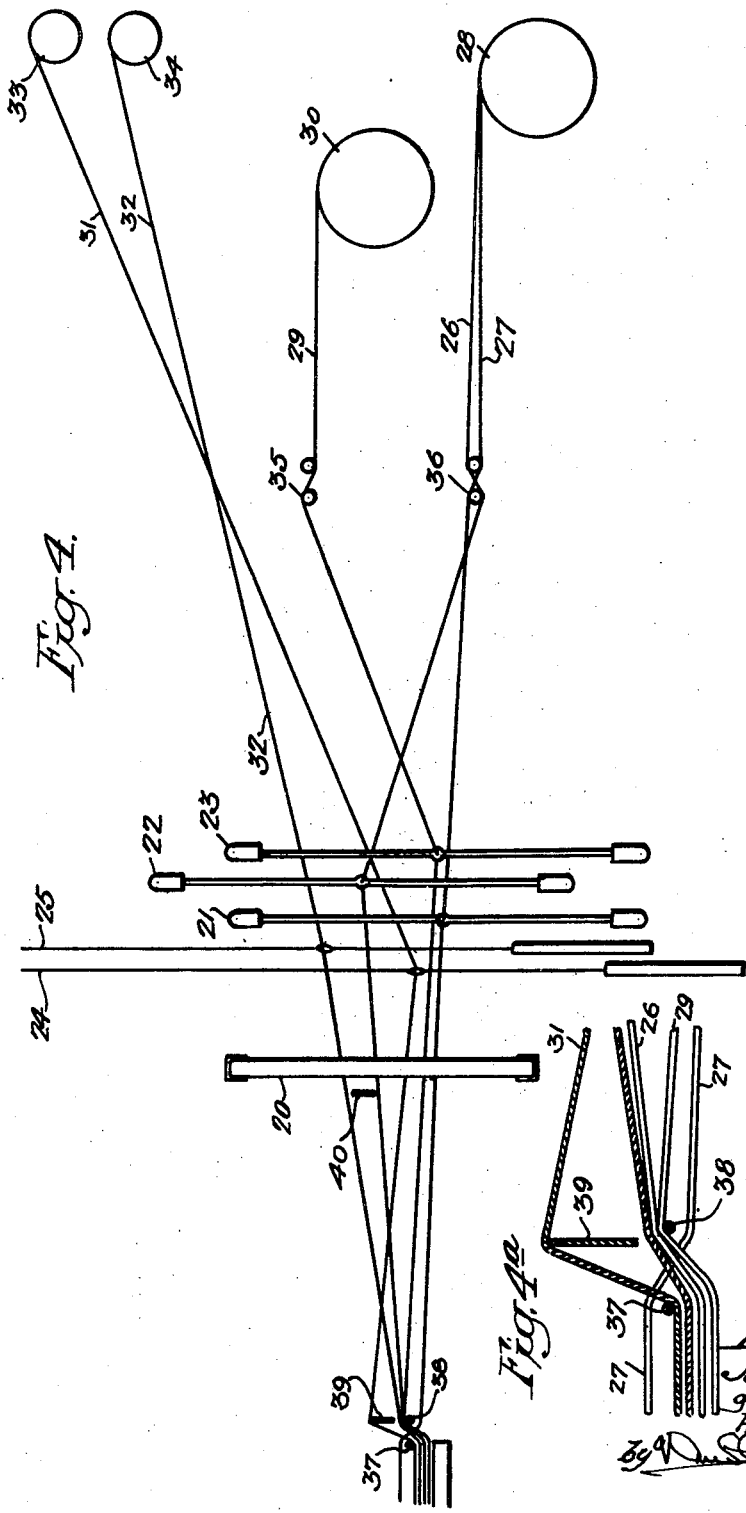

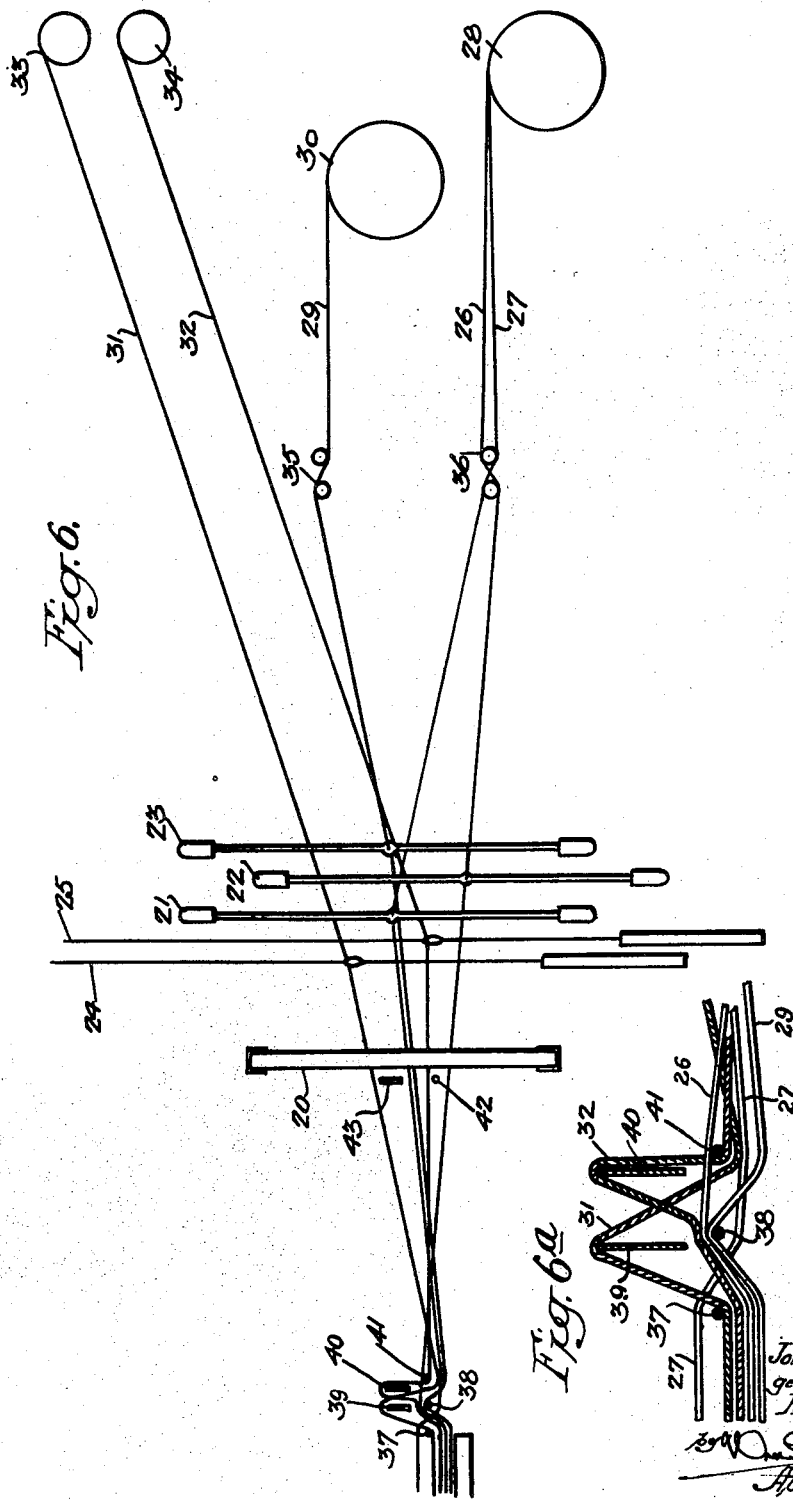

July 26, 1949.  J. H. HARDING  2,477,249
GENERALLY KNOWN AS
H. J. HARDING
LOOM FOR WEAVING PATTERNED PILE FABRICS
Filed Oct. 29, 1946  14 Sheets-Sheet 7
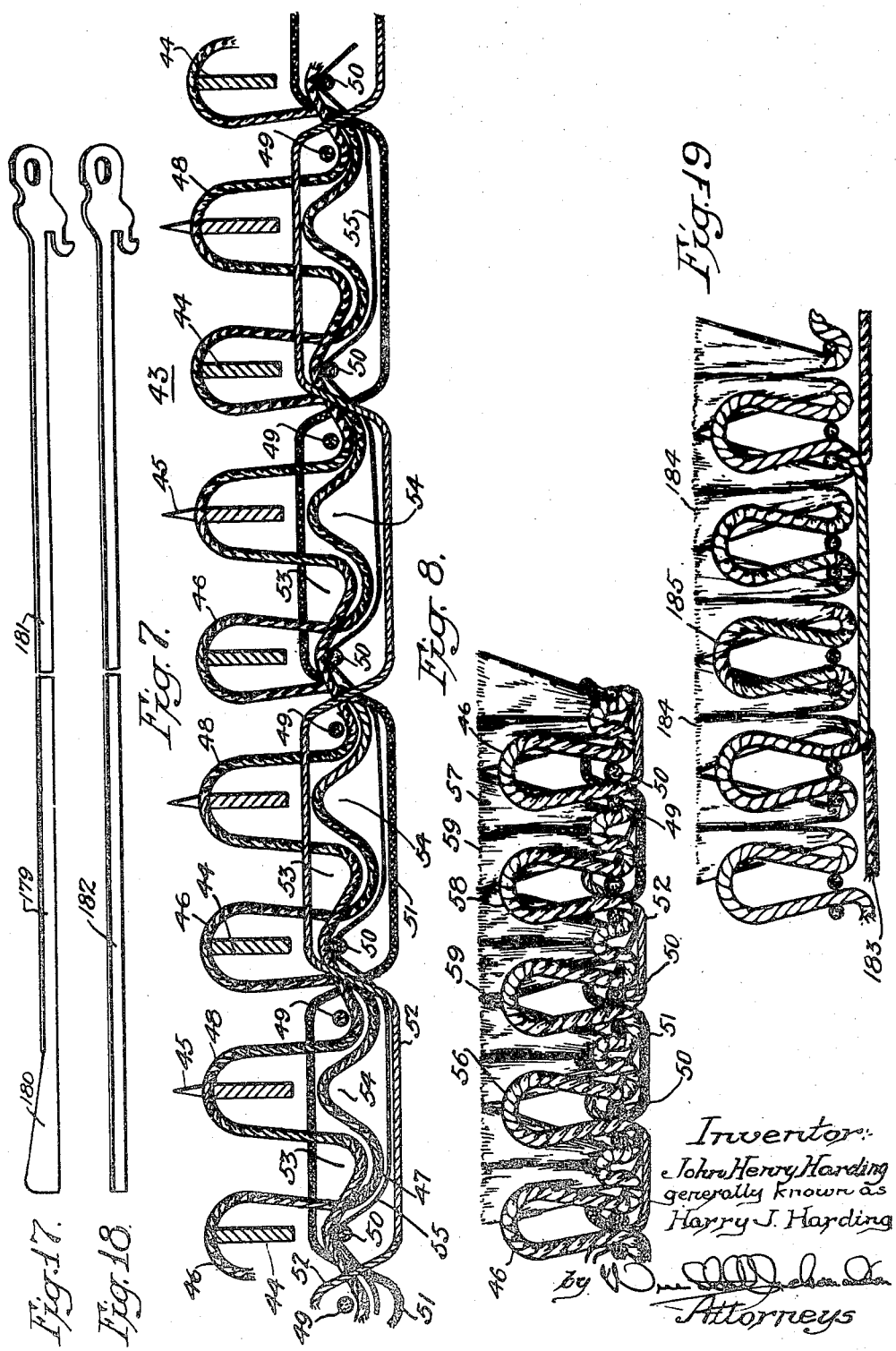
Inventor:
John Henry Harding
generally known as
Harry J. Harding
by
Attorneys

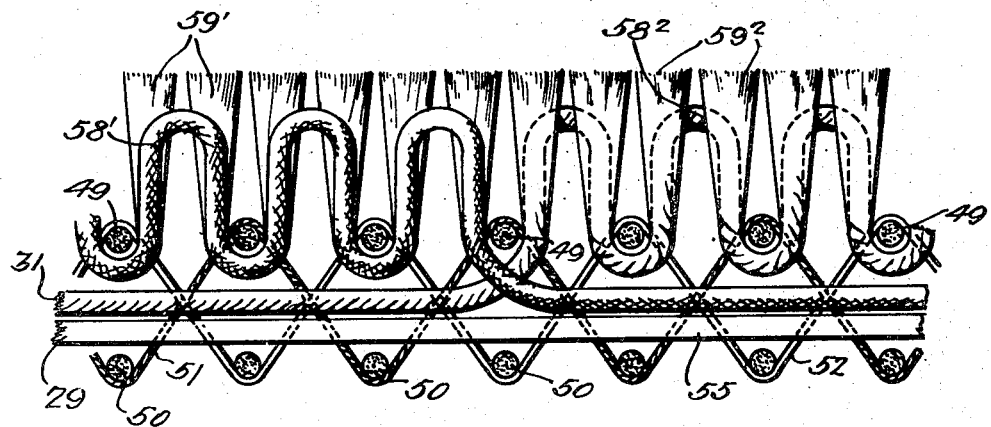
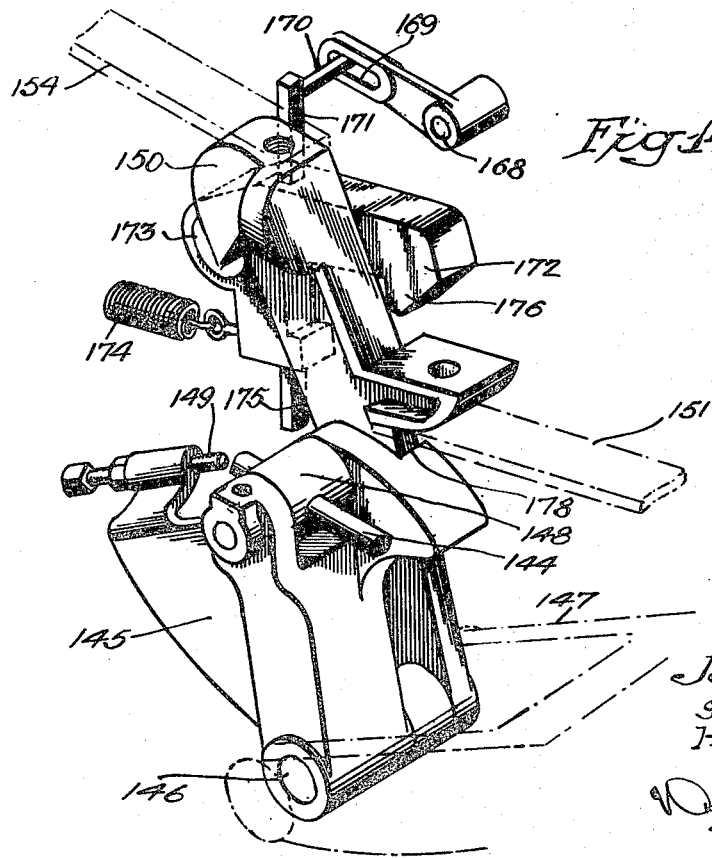

July 26, 1949.  J. H. HARDING  2,477,249
GENERALLY KNOWN AS
H. J. HARDING
LOOM FOR WEAVING PATTERNED PILE FABRICS
Filed Oct. 29, 1946  14 Sheets-Sheet 9
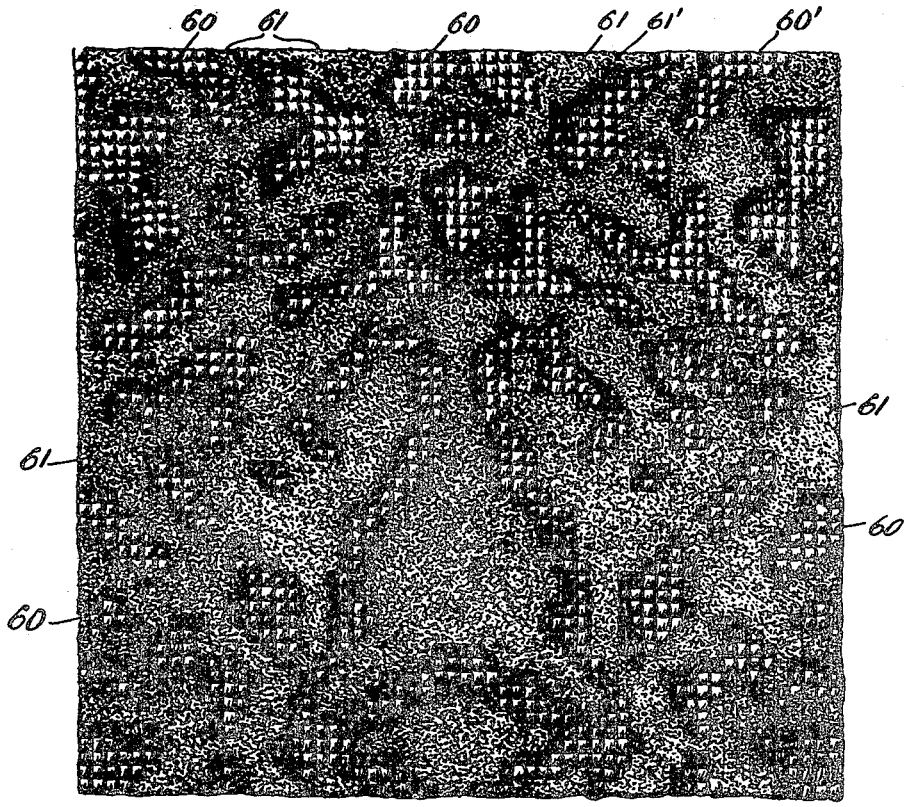
Fig. 9.
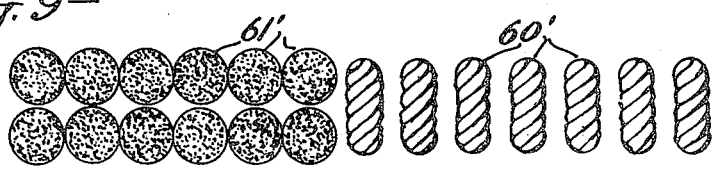
Fig. 9ᵃ.
Inventor:
John Henry Harding
generally known
Harry J. Harding.
by
Attorneys.

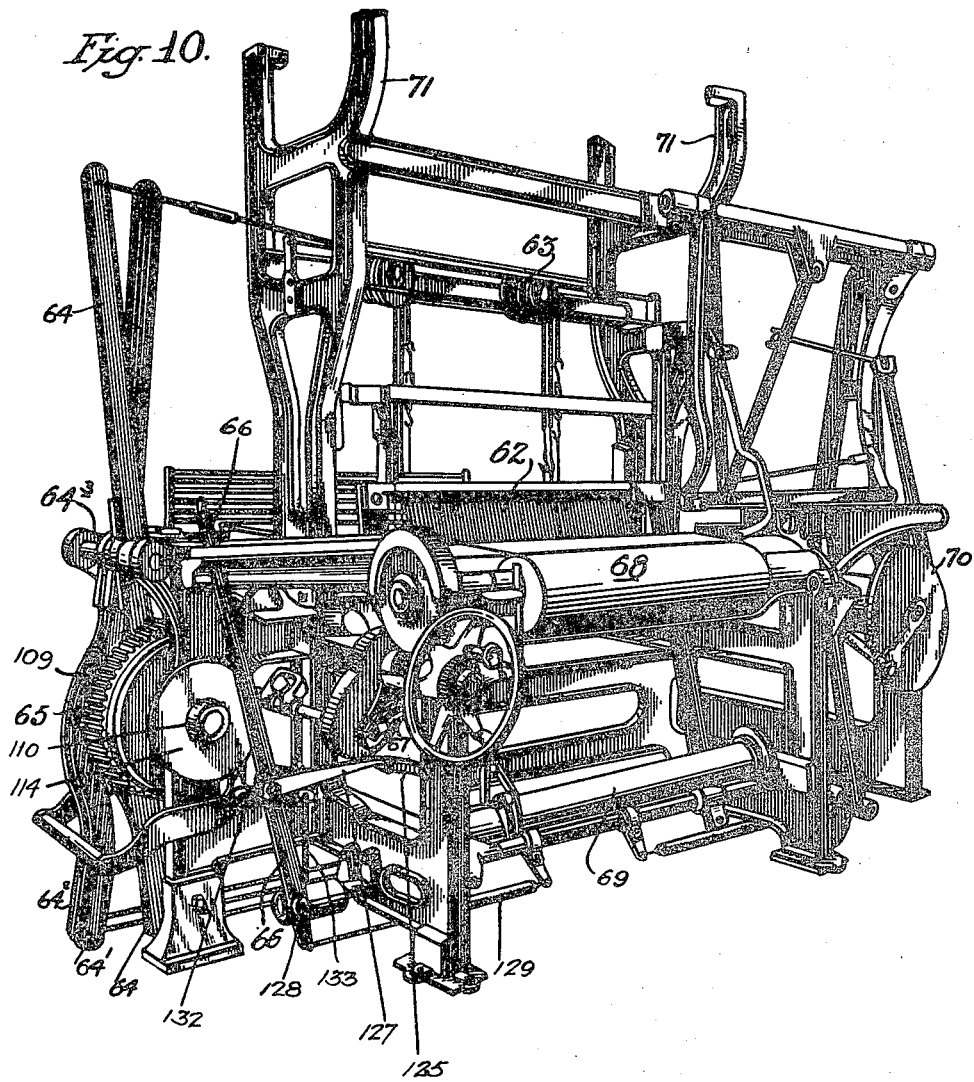

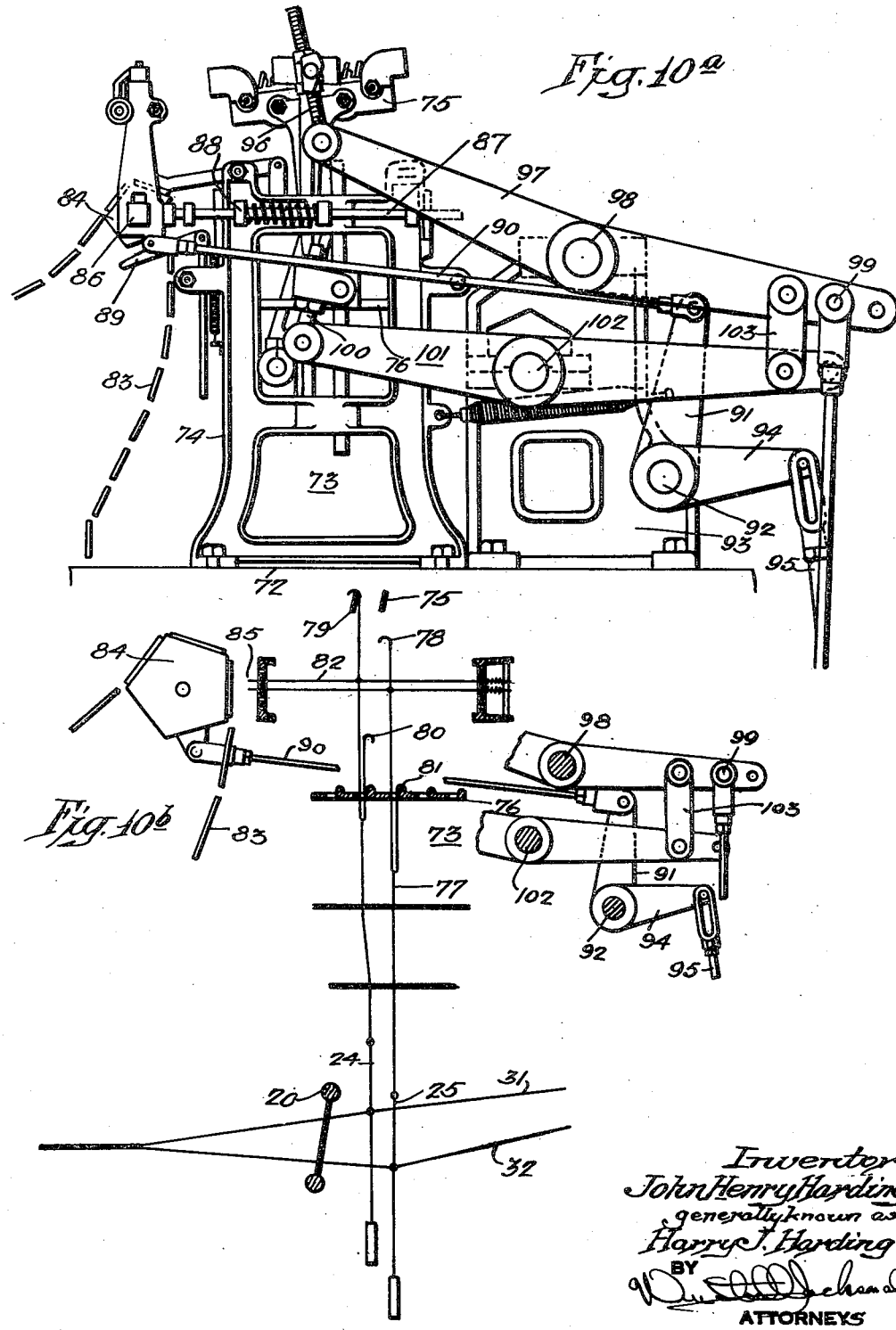

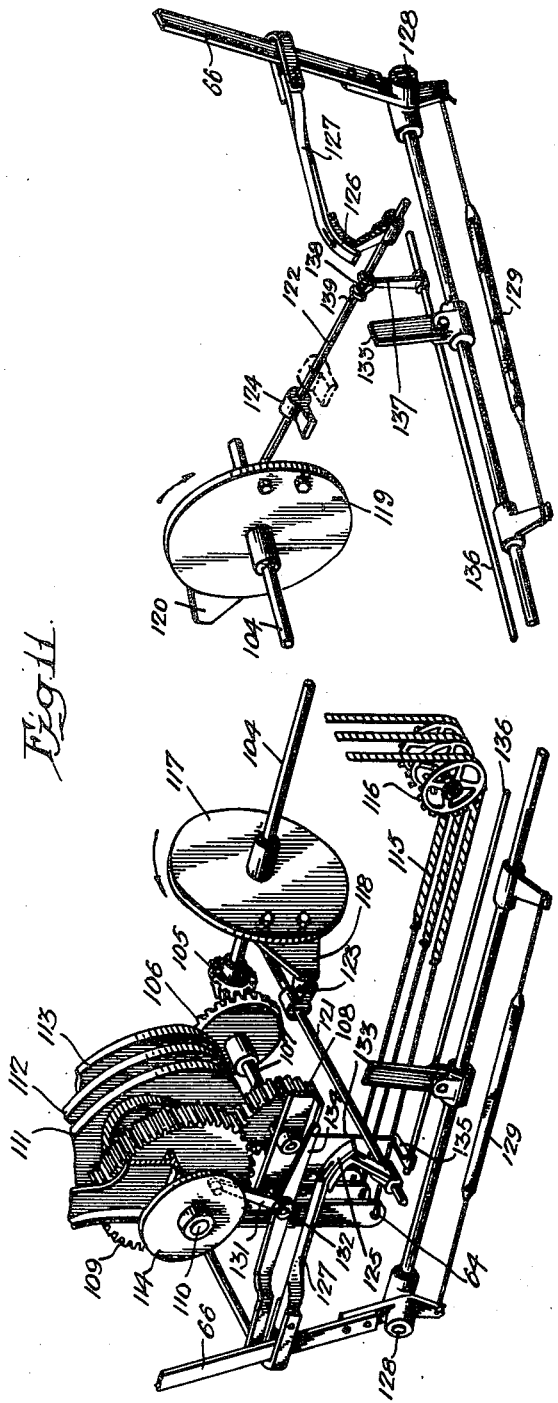

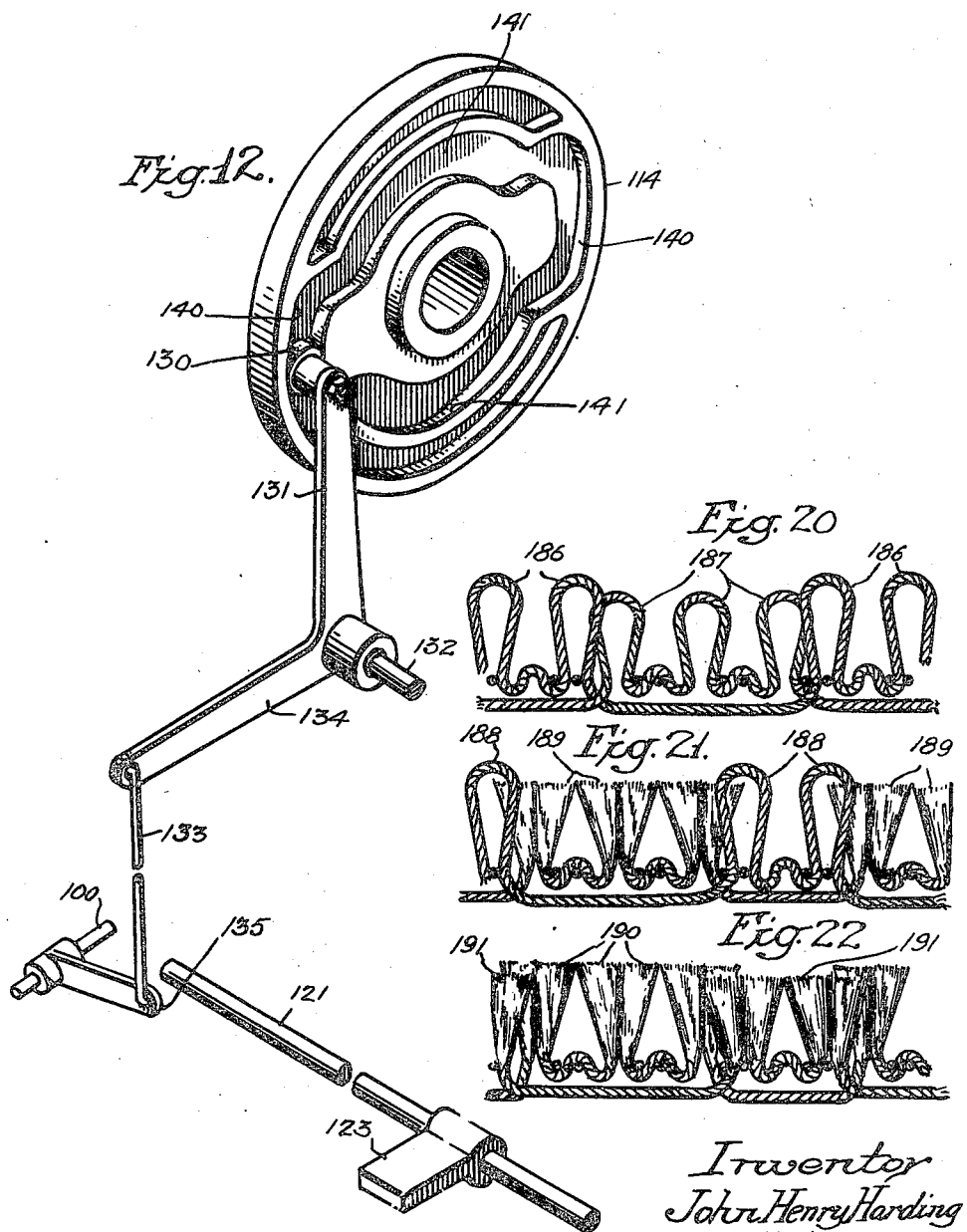

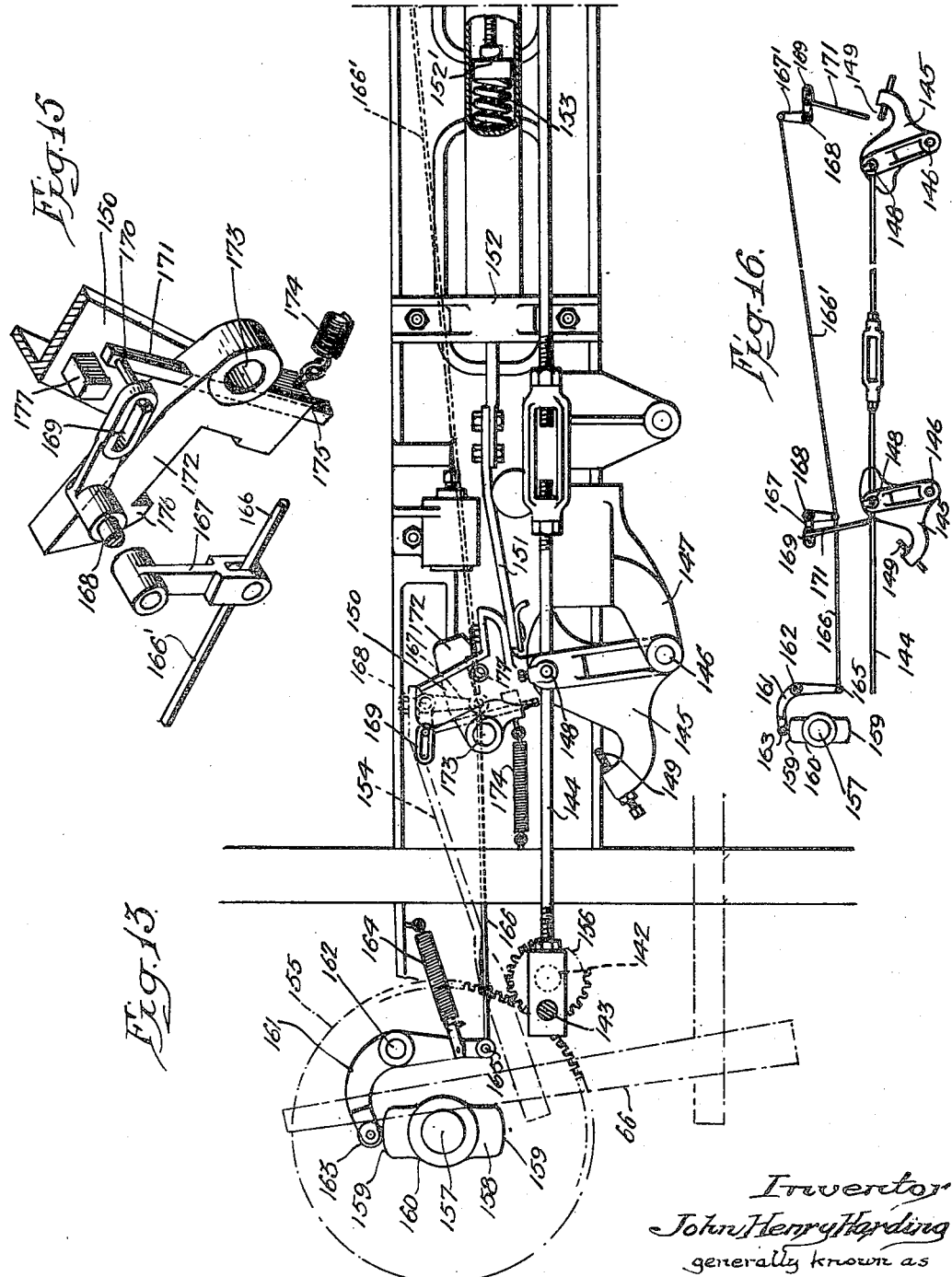

Patented July 26, 1949

2,477,249

UNITED STATES PATENT OFFICE 2,477,249

LOOM FOR WEAVING PATTERNED PILE FABRICS

John Henry Harding, generally known as Harry J. Harding, Philadelphia, Pa., assignor to C. H. Masland & Sons, Carlisle, Pa., a corporation of Pennsylvania Application October 29, 1946, Serial No. 706,353

7 Claims. (Cl. 139—39)

My invention relates to a loom for producing a pile fabric having two different types of pile, high and low, cut and uncut, either or both, produced on one cycle.

The present application is a continuation in part of my application Serial No. 631,202, filed November 27, 1945, for Fabric, process and loom, now abandoned. Fabric subject matter relating to the present application is described and claimed in my copending application Serial No. 706,354, for Fabric and process, filed October 29, 1946. Process subject matter related to the present application is described and claimed in my copending application Serial No. 772,080 for Process of weaving a pile fabric, filed September 4, 1947.

A purpose of my invention is to weave both a cut and an uncut pile tuft, either or both as the pattern requires, on a given cycle of loom operation, and which in the finished fabric will be in the same transverse line of tufts.

A further purpose is to employ two heights of pile in the same transverse row of tufts in the finished fabric, either or both of which may be cut or uncut.

A further purpose is to weave a pile fabric with one tuft raised on the second of a pair of weft shots and another tuft raised on a weft miss, preferably on the second of a pair of weft misses, either or both as the pattern requires, in a given loom cycle.

A further purpose in the weave of a floor covering is to insert only two shots of weft for two wires which are used selectively on one weaving cycle as the pattern may require.

A further purpose is to form a pile fabric over a cut wire and an uncut wire both inserted on a given cycle, while inserting only two weft shots during the cycle.

A further purpose is to provide a pile fabric having alternate cut and uncut pile and in which there are two solid picks and then two blank picks.

A further purpose is to provide a pile fabric in which there are 16 wires for each 16 solid picks but for 32 beats of the lay.

A further purpose is in special weaving to start the cycle with one chain warp heddle up, the other chain warp heddle down and the stuffer warp heddle down, the lash or pile down, and pick; reverse all of the heddles while carrying the lash or pile up, insert a wire and pick; reverse the stuffer warp heddle, carrying the lash or pile down and miss a pick; maintain the positions of the chain warp heddles and stuffer warp heddle, while carrying the lash or pile up, insert a wire and again miss a pick; and then repeat the cycle, beginning with the heddle positions unchanged, the lash or pile down and pick, etc.

A further purpose is to provide eight revolutions of the crank shaft to one revolution of the treadle box, and alternate two solid picks and two blank picks, to allow for change in the character of wire as the pattern requires.

A further purpose is to reverse the fine chain warps between adjacent solid picks, to correspondingly reverse the stuffer warp between adjacent solid picks and to keep it below the pick positions at blank picks and to provide uncut pile coincident with one of the solid picks and cut pile between one pair of solid picks and the next, as required by the pattern.

The fine chain warps are reversed between each adjacent pair of solid picks and then remain one up and the other down during the next two blank picks, being reversed between the following adjacent pair of solid picks to then remain in the same raised or lowered position until the next two adjacent solid picks. The result is that the fine chain warp heddles are one lifted and the other lowered between two solid picks and remain in their lifted and lowered position until the next pair of solid picks, between which they are lowered and lifted respectively, this action keeping on progressively. Meantime the stuffer warp heddle is lifted between each pair of solid picks, lowered immediately after, and held down during the intermediate blank picks and the first succeeding solid pick, then lifted and lowered again over the second of the adjacent solid picks.

This invention relates to the formation of a relief pattern in weaving pile fabrics through control of the position and relation of cut and uncut pile tufts and to a process of manufacture of the fabric.

A further purpose is to use the difference in appearance between the surfaces secured by cut as compared with uncut pile tufts as a means of weaving a design or figure within transverse rows of tufts in a pile fabric.

A further purpose is to use a standard type of loom with suitable control of the picking cam so as to intersperse a pair of solid picks and a pair of blank picks and suitably to control the heddles lifting and lowering the chain warps, stuffer warp and pile warps and alternate or intersperse cutting and non-cutting pile wires in accordance with the extent and position of cut pile tufts and uncut pile tufts by which the design is to be effected.

A further purpose in my special pile fabric is to take a number of solid picks at intervals between blank picks, each of which shall have a suitable relation, preferably each to be equal to the number of pile wires used, cutting the tufts formed by some of the pile wires and not cutting the tufts formed by intervening pile wires, in a number and relation of cut and uncut tufts corresponding with the field and design of the pile fabric woven.

A further purpose is to intervene blank picks preferably in pairs between solid picks in pairs with cut and uncut pile respectively alternating, one opposite the solid picks and the other opposite the blank picks.

A further purpose is to obtain an embossed effect in pile fabric weaving without unnecessary utilization of weft yarn by raising the pile over the second of a pair of weft shots in the cycle and/or as the pattern requires raising the same or another pile yarn to a different height over one of two misses in the shuttle operation in the same cycle.

A further purpose is to bring pile tufts of different kinds into the same transverse row of pile tufts in the finished fabric while employing mispicks between the respective different tufts in weaving, without crossing the chain warps in the interval between the tufts.

Further purposes appear in the specification and in the claims.

In the drawings I have chosen to illustrate two embodiments, of numerous types of looms in which the invention might be employed, choosing the forms shown from the standpoint of convenience of illustration, satisfactory operation and clear exemplification of the principles involved.

Figures 1 to 6 inclusive are diagrammatic, longitudinal illustrations of the steps in weaving the fabric of the invention.

Figures 3ª, 4ª, 5ª, and 6ª are enlarged diagrammatic illustrations of fragments of the respective Figures 3 to 6 inclusive.

Figure 7 is a diagrammatic, longitudinal section of the preferred form of the weave of the present invention prior to cutting of the pile.

Figure 8 is a diagrammatic, longitudinal section similar to Figure 7, but showing the cut pile in cut form.

Figure 8ª is a longitudinal section of the completed fabric.

Figure 9 is a diagrammatic plan view of the fabric of the invention.

Figure 9ª is an enlarged fragment of Figure 9.

Figure 10 is a perspective view of one loom to which the invention has been applied.

Figure 10ª is a fragmentary diagrammatic elevation of a jacquard mechanism.

Figure 10ᵇ is an enlarged central vertical section of the jacquard mechanism of Figure 10ª.

Figure 11 is a partially diagrammatic fragmentary perspective of the two sides of the loom, showing one form of picking mechanism.

Figure 12 is a perspective of a picking cam assembly for a four shot weave using the picking motion of Figure 11.

Figure 13 is a front elevation of a variant picking mechanism.

Figure 14 is an enlarged fragmentary perspective of the picking latch mechanism of Figure 13.

Figure 15 is a fragmentary perspective of the reverse side of the mechanism shown in Figure 14, detached or pulled apart to show the interrelations of the parts.

Figure 16 is a diagrammatic view showing the means of connecting the picking mechanism on the two sides of the loom.

Figures 17 and 18 are fragmentary side elevations of wires.

Figures 19 to 22 inclusive are diagrammatic longitudinal sections of variant weaves embodying the invention.

In the drawings, like numerals refer to like parts throughout.

In the present invention, a two shot fabric is produced since there are two wefts per cycle, but the treadle box motion, the take-up and the pick are in the preferred embodiment on a four shot basis since there are preferably two miss shots per cycle.

Figures 5, 5A:
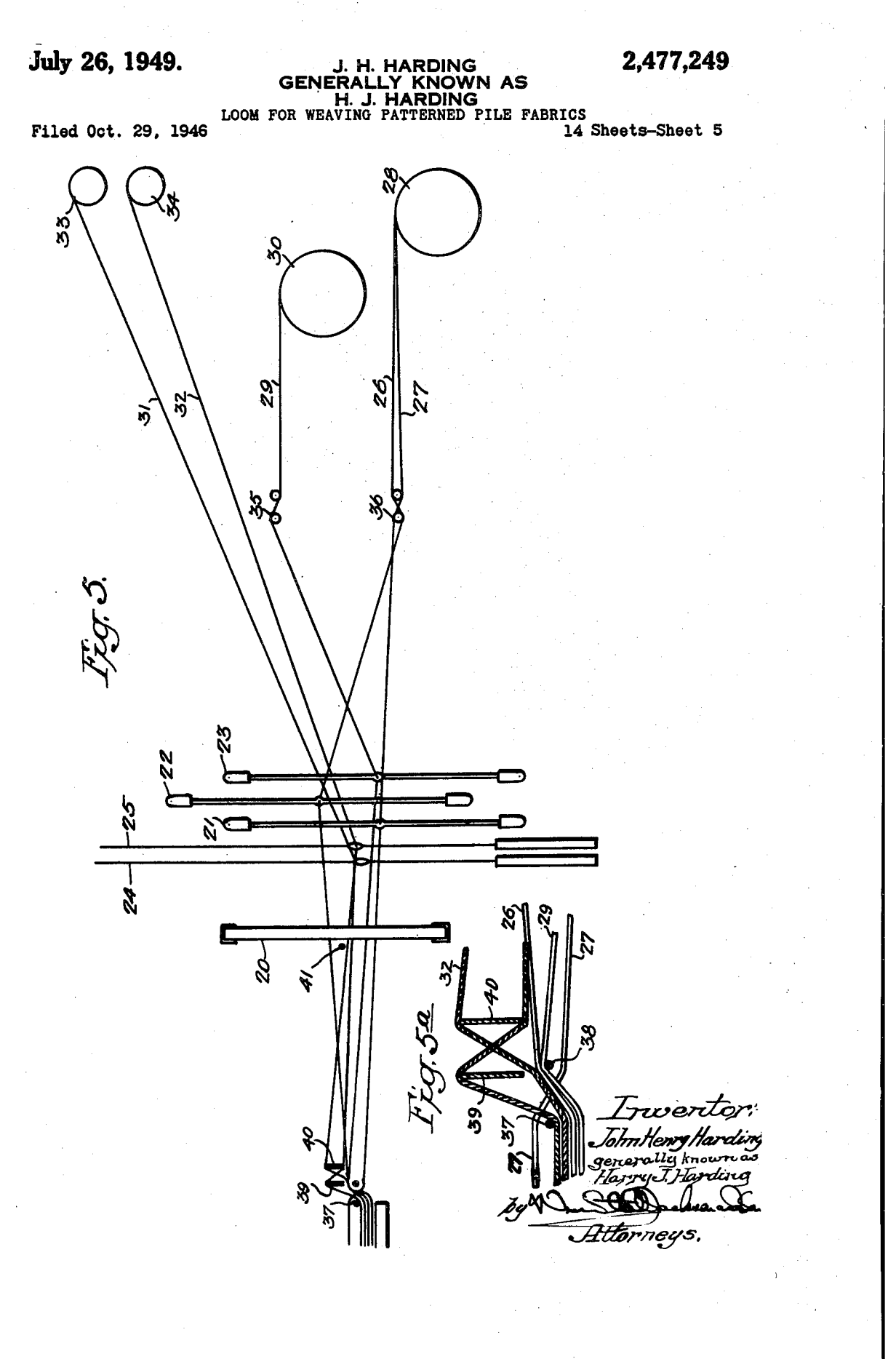

Referring particularly to Figures 1 to 6 inclusive, which illustrate the weaving of a two frame Wilton carpet (floor covering), a loom is diagrammatically illustrated of any suitable design, having reed 20, front chain warp heddle 21, rear chain warp heddle 22 and stuffer warp heddle 23, as well as lingoe heddles 24 and 25 which carry the pile warps in raised or lowered position. The double chain warp sets 26 and 27 are supplied from beam 28. The stuffer warp 29 is mounted on stuffer beam 30. It will be evident, of course, that any suitable number of stuffers desired may be employed.

Any suitable number of pile yarns may be used, of which two are illustrated at 31 and 32, supplied from creel frames 33 and 34. The invention has been applied successfully using up to six pile warps, and the choice of two pile warps herein is for the sake of simplicity in illustration. As well known in the art, the stuffers and chains are supplied over jumbos 35 and 36.

Each of Figures 1 to 6 corresponds to a different rotation on the crankshaft in a normal loom.

Figure 1 shows the assumed condition at the beginning of a cycle, based upon the production of a two shot fabric using a four shot motion. At the beginning of the cycle shown in Figure 1, the front chain heddle 21 is up, the rear chain heddle 22 is down and the stuffer warp heddle 23 is down, while the lingoe heddles 24 and 25 are also down. In this position, the first shot of weft 37 is taken, passing under chain warp 27 and over all other warps. At the end of the step shown in Figure 1, the reed moves forward beating up the weft or filling shot in the conventional manner.

As shown in Figure 2, the heddles are reversed in this position, the front chain heddle 21 moving down and the rear chain heddle 22 and stuffer warp heddle 23 moving up. Some lingoe heddles 24 rise fully, lifting the pile warp 31, while the other lingoe heddles 25 go up half way, as the pattern requires. In this position, a shot of weft 38 is inserted under the stuffer 29, the pile warps 31 and 32 and the chain warp 26, and above the chain warp 27. A wire 39 is inserted above everything except the pile warp 31, and the reed moves forward beating up the weft.

In the position of Figure 3, the chain warp heddles remain unchanged while stuffer warp heddle 23 moves down, and lingoe heddles 24 and 25 carrying the pile likewise move down. In this position the loom misses a pick, although the reed comes forward and again beats up the previous shot. As shown in Figure 3ª, the forming pile at this position includes the two wefts 37 and 38 and the wire 39, with no additional weft. The last operation inserted either a cut wire or an uncut wire, but in the preferred embodiment as later explained, it will be an uncut wire. This step is convenient to conform to a four step cycle commonly used and may if desired be the occasion for the removal of wires.

As shown in Figure 4, during the next step the front and back chain heddles and the stuffer heddle remains the same while some lingoe heddles 24 come up half way and other lingoe heddles 25 come up fully as the pattern requires. A wire 40 is inserted below the pile warp 32 and above all other warps, while the weft shot is missed. As shown in Figure 4ª, the position of the forming fabric is substantially the same as illustrated in Figure 3ª since the previous shot was a miss. The reed comes forward and beats up the weft 38 in the usual manner.

The four steps described represent a complete cycle. To illustrate the relation with the succeeding cycle, a portion of the next cycle is illustrated in Figures 5 and 6.

In Figure 5, the front and rear chain warp heddles and the stuffer heddles remain the same, the lingoe heddles both remain down and the weft shot 41 is taken passing under the chain warp 26 and above all other warps. The condition of the fabric resulting from the previous cycle is represented in Figure 5ª, with two wefts in position and two wires also in position, one of the wires corresponding to the second miss shot.

As illustrated in Figure 6, the next step results in a reversal of the chain warp heddles and stuffer warp heddle, while some lingoe heddles 24 are up and other lingoe heddles 25 are half way up, as the pattern requires. A shot of weft 42 is inserted below all warps except chain warp 26, and a wire is inserted above all other warps except pile warp 31. The condition of the fabric resulting from the previous operation step is illustrated in Figure 6ª.

The beating up of the lay at the mispick position and on the next pick performs an important function, which will be understood by reference to Figure 6ª. It will be noted that once the wires are withdrawn, there is nothing in the structure of the fabric separating the different tufts formed over the respective wires 39 and 40. The beat of the lay at the mispick position and the next pick applies tension on the chain warps and the pile, and as soon as the wires are removed this tension pulls the different tufts formed over the wires 39 and 40 into the same transverse line of tufts, so that then they will appear from the face of the fabric to be in the same transverse line of tufts, as in fact they previously have been from the standpoint of the structure of the fabric.

The successive wires inserted will normally be alternately low wires and high wires. Due to the fact that if the low wire is inserted last in the cycle, it will not be protected against being pushed up by the reed, it is very desirable to insert the low wire first and the high wire second in the sequence. Thus wire 39 is preferably a low wire and wire 40 is a high wire. By this procedure the wefts of the next cycle tend to bind the high wire in position and it protects the low wire ahead of it from being improperly forced up by the reed.

It is also very desirable to use a combination of uncut and cut wires, the low wire being normally a non-cutting wire to produce an uncut pile loop, and the high wire being a cutting wire to produce a cut pile tuft. This results in the mosaic effect later described.

The steps which take place in one cycle produce either or both of two tufts (depending upon the pattern requirement) which are transversely in the same line of tufts as all other tufts produced on that cycle, once the wires are removed.

In the preferred embodiment of the weave of the present invention, each second cycle (after four picks and four mispicks) is a true repetition and each next cycle (after two picks and two mispicks) is a repetition except that the chain warps are reversed.

It will be noted that while the drawings show two pile tufts of different characters forming selectively at a given lateral point on a given cycle, one opposite the second of a pair of picks and the other opposite the second of a pair of mispicks, the action of the subsequent beat of the lay applied to the mispicks and to the next pick creates the tension in the chain warp and in the pile which, on removal of the wires, brings all pile tufts formed on a given cycle into the same transverse line of tufts. Thus though Figure 7 and other similar figures show high pile and low pile tufts which appear to be in a different transverse line, when the fabric has been beaten up and the wires removed the various tufts transversely across the fabric formed on a given cycle, whether they be high tufts or low tufts or cut tufts or uncut tufts, are brought into the same transverse line of tufts. This is important from the standpoint of appearance, economy in material used in production of the fabric and wearing qualities of the fabric.

The nature of the fabric 43 will be better understood by reference to Figure 7 which shows diagrammatically a sequence of non-cutting wires 44, desirably relatively lower, and cutting wires 45 desirably relatively higher. The pile formed by the loops 46 extending over the non-cutting wires is carried to the back of the fabric at 47, coming up again as the pattern may require. In Figure 7 the loops 46 are brought up over each of the uncut wires, whereas in actual practice they would normally only be brought up at points where the pattern required loops rather than cut pile. Likewise the loops 48 subsequently to be cut are shown in Figure 7 as carried over each of the cutting wires, whereas in actual practice they would normally not be carried up where uncut loops were being used on the particular cycle and lateral position.

It will thus be evident that for each cycle there are two wires of different dimensions or types inserted, but the pile will normally be carried over only one of them in accordance with the demands of the pattern. Both of these wires form tufts which, after the wires are removed, lie in the same transverse row. The weft shots 49 and 50 are in pairs between which the chain warps 51 and 52 cross, the intermediate spaces 53 and 54 being indicated as miss shots. Actually in the finished fabric the wefts will, of course, be positioned with weft 49 of each pair to the front of the fabric and weft 50 of each pair to the back of the fabric, and the spaces corresponding to the miss shots will be lost, bringing all solid shots into uniform and normal spacing sequence (Figure 8ª). But the effect of the miss shots will be there, since the different tufts formed with the weft shot and the following miss shot will lie in the same transverse line of tufts. The stuffer warp 55 is carried up over each second shot 50 of the pair, but otherwise remains in the back of the fabric.

The result achieved is better indicated in Figure 8 in which the tufts for convenience in illustration retain the conventional positions which they had when held by the wires. The relatively low uncut tufts or loops 46 appear in a group at 56 corresponding to a portion of the pattern calling for uncut loops, while the cut tufts 57 resulting from cutting of the loops 48 correspondingly conform to a portion of the pattern calling for cut pile.

One of the important features of the invention is that the uncut tufts or loops 58 formed in a given cycle are, after the fabric is beaten up and the wires are removed (the wires will not normally be removed until considerably later, as in normal practice, and this may be accomplished on the third step of the cycle), in the same transverse line of tufts as the cut tufts 59, formed on that cycle, although actually in Figure 8 the tufts 59 appear slightly to one side, in accordance with the convention of illustrating the fabric before the beat.

Figure 8$^a$ shows more clearly the actual form of the completed fabric, with wefts 50 at the back and wefts 49 at the front, and low uncut pile tufts 58' standing in the same transverse line of tufts and in front of higher cut pile tufts 59', while higher cut pile tufts 59$^2$ stand in the same transverse line of tufts with and in front of low uncut tufts 58$^2$. Thus it will be seen that in the finished fabric the cut and uncut loops are in the same transverse row.

Figures 9 and 9$^a$ illustrate the face of a pile fabric according to the invention. The uncut pile areas 60 in base relief are interspersed with cut pile areas 61 which are higher and more prominent, causing an embossed or mosaic effect.

Certain tufts 60' of the areas 60 are on the same transverse row of tufts as other tufts 61' in the areas 61. One of the important advantages of the invention is that it is possible to place the cut and uncut or high and low pile tufts in the same transverse row of tufts.

The loom of the present invention may correspond to any standard design with structural modifications to accomplish the special weave. The invention will normally be applied by modifying a standard Wilton loom.

Figure 10 shows a typical Dobcross Wilton loom omitting the jacquard (shown in Figures 10$^a$ and 10$^b$), which has been modified as later explained to produce my special weave. The loom is of well known type, having a reed 62, heddle harness 63, treadle box levers 64, treadle box 65, picking sticks 66, take-up 67, spike roll 68, take-up roll 69, wire motion mechanism 70, and jacquard standards 71.

Figures 10$^a$ and 10$^b$ illustrate a conventional jacquard mechanism consisting of an upper frame 72 mounting the usual jacquard mechanism 73 having end frames 74 in which are vertically slidably mounted an upper grid 75 and a lower grid 76.

The jacquard mechanism 73 also comprises the usual series of wires 77, of which only two are shown, but of which one will be used for each of the pattern threads of each pile warp. Lingoe heddles 24 and 25 are suitably operated by the wires 77.

Each jacquard wire has the usual upper hook 78 which is adapted to be engaged by a bar 79 of the upper grid 75 under some operating conditions as well known in the art. Each jacquard wire 77 also comprises a lower hook 80 adapted under normal conditions to rest on a bar or rib 81 of the lower grid 76.

The jacquard wires 77 are controlled by needles 82 and these needles are controlled by a string of jacquard cards 83 which pass around a card cylinder 84, which is reciprocated bodily back and forth with respect to ends 85 of the needles 82, as well known in the art of weaving, to present the suitably punched cards of the string 83 successively to the operating ends 85 of the needles 82.

The card cylinder 84 is mounted for intermittent rotation, in the usual manner, in bearings 86 carried on the ends of axially movable rods 87 slidably mounted in bearings 88 on the frame 74 of the jacquard mechanism 73, and the usual hooks 89 are provided for turning the cylinder one step at a time for each reciprocation of the cylinder toward and away from the needles 82.

The cylinder is reciprocated by operating rods 90 connected at one end to the bearing heads 86 on the cylinder supporting rods 87, the opposite ends of the operating rods 90 being connected to the outer ends of levers 91. The levers 91 are fixed on rock shafts 92 rotatably mounted in frames 93 supported by the superstructure 72.

On the cylinder rock shaft 92 is a lever 94 the other end of which is operatively connected to a suitable link 95 driven by the loom as well known in the art.

The grids 75 and 76 are coupled together and operate in unison with differential rise and fall between the two grids, as well known. The upper grid 75 is connected at each of its opposite ends by links 96 to one end of levers 97 pivotally mounted on a rock shaft 98 having bearing support on the frame 93, the opposite lever end being connected to a link 99 for operation of the frame from the loom in the well known manner.

The lower grid 76 is operatively connected at each of its ends by a link 100 to one end of a lever 101, of which there are two, only one being shown. The levers 101 are rigidly secured to a rock shaft 102 which is rotatably mounted in the frame 93. One of the levers 101 is provided at its opposite end with an operating link 103 which connects to the outer end of lever 97.

As well known in the art, the card cylinder moves toward the ends of the needles 82 of the jacquard mechanism once in any single step of the weaving operation and each card in the string is adapted to select certain pattern threads to be raised in a manner to form the pile face of the fabric and produce the desired design.

In order to modify the loom of Figure 10 to produce my special weave, it is of first importance to change the picking mechanism so that the cycle will begin with two picks and follow with two mispicks. As shown in the modified treadle box of Figure 11, power to drive the picking mechanism is transmitted through bottom shaft 104 running from side to side of the loom on suitable bearings, not shown, turning in the direction of the arrow, and carrying bevel gear 105 which drives cooperating bevel gear 106 on counter shaft 107 carried by suitable bearings, not shown. The counter shaft 107 also carries pinion 108 meshing with treadle box pinion gear 109 on treadle box shaft 110 supported in suitable bearings, not illustrated. Treadle box gear 109 drives stuffer heddle cam 111 and chain heddle cams 112 and 113, of well known character. Also turning on the same shaft is picking change cam 114 shown more in detail in Figure 12.

The stuffer and chain warp heddle cams may be identical with those normally used, preferably modified at approach and release portions to give quick pick-up and release with change of driving speed. In the normal prior art construction a one-to-one ratio has been used on the gears 105 and 106, whereas in the present invention it has been found desirable to employ a one-to-two ratio, thus cutting the heddle cam speed in half. The ratio between the pinions 108 and 109 is one-to-two, so that the ratio between the bevel gear 105 and the treadle box shaft 110 is one to four, giving one rotation of the picking change cam 114 for every two cycles, or one-half rotation per cycle. The heddle cam speeds are cut in half with respect to the prior art practice.

The mechanism for transmitting heddle motion from the cams consists of the treadle box levers 64, 64' and 64², which are pivoted at 64³ and provided with followers, not shown, which ride the cams as well known in the art. As the treadle box levers are moved, they transmit the motion to the heddle harnesses through rigging such as chains 115, passing over suitable sprockets 116 as in prior practice.

At the two sides of the loom, or at opposite ends of the bottom shaft 104, I provide a left hand picking disc 117 having a picking hammer 118 and a right hand picking disc 119 having a picking hammer 120, the respective picking hammers being 180° out of phase as shown in Figure 11, so that when the hammer at one side is in picking position the hammer at the other side is 180° removed therefrom. At each side of the loom is a picking shaft 121 on the left, and 122 on the right, carrying a picking tongue 123 on the left and 124 on the right, which are located toward the outside of the loom with respect to the picking disc and at the proper time are engaged and depressed by the appropriate picking hammer. The picking shafts are supported in suitable bearings not shown. Picking shaft 121 merely rotates, but picking shaft 122 both rotates and moves longitudinally as later explained. On each picking shaft is a picking wing 125 on the left and 126 on the right, the two picking wings being oppositely directed as well known. Each picking wing through its leather strap 127 applies an impulse to the appropriate picking stick 66 suitably pivoted at 128 and spring urged to return at 129 toward a suitable abutment. The action of the picking stick in throwing the shuttle is of course well known in loom design.

The picking change cam 114 operates on a follower 130 (Figure 12) at the end of a bell crank lever 131 pivoted at 132 to vertically urge the pull rod 133, on the opposite end 134 of the bell crank, pulling or pushing on the lever 135 on picking change shaft 136 running from left to right of the loom and mounted in suitable bearings, not shown. On the right hand side of the loom, shaft 136 carries picking shift lever 137 whose forked end 138 engages between two abutments 139 on longitudinally movable picking shaft 122. Thus when the follower 130 is on a "high" of the cam, the picking tongue 124 is in picking position and adapted to be engaged by the picking hammer 120, while when the follower 130 is on a "low" of the cam, the picking tongue 124 is moved to the position shown in dot and dash lines in Figure 11 so that it is missed by the picking hammer 120 and picking does not occur.

The picking change cam as shown in Figure 12 has a comparatively short "high" or outer cam portion 140 corresponding in length to one step in the cycle, and a substantially longer "low" or inner radial cam portion 141 corresponding in length to three steps of the cycle, and 140 and 141 totalling one-half revolution, to be accomplished in one cycle.

Thus at the beginning of a cycle, as shown in Figure 1, the shuttle is in the right hand position, and the picking change cam 114 is in "high" or picking position, with the follower 130 at a "high" or radially outer portion 140 of the picking change cam. This places picking tongue 124 in the position shown in full lines in Figure 11. The picking hammer 120 at the right is 180° out of the position shown in Figure 11; or in picking position, and the shuttle is thrown from right to left. Nothing happens regarding the shuttle on the left because the picking hammer is 180° out of phase and the shuttle is not over in the left hand box at the beginning of this step.

In the next step, as shown in Figure 2, the picking change cam moves on until the follower 130 is in the "low" or radially inner portion 141 of the cam path, moving the right hand picking tongue 124 out of picking position. This is immaterial in any case because the right hand picking hammer 120 is 180° removed from picking position and the shuttle is over on the left so that no pick could occur from the right. Over on the left, however, the picking hammer 118 is in picking position and encounters the picking tongue 123, throwing the shuttle from left to right.

In the next step, shown in Figure 3, no picking action can occur from the left because the picking hammer 118 is 180° out of picking position, and the shuttle is on the right. The follower 130 is still in a radially inner or "low" position 141 of the picking change cam, so that the right hand picking tongue 124 is in the dot-and-dash or inoperative position of Figure 11, and no picking can occur, notwithstanding that the shuttle is in the right hand box. This is the first of the misses on the cycle.

In the next step, corresponding to Figure 4, the follower 130 is still in a "low" or radially inner portion 141 of the picking change cam, and the picking tongue 124 on the right is in inoperative or miss position, so that there is a miss from the right. Over on the left the picking hammer 118 is in picking position and actually strikes the picking tongue 123 and operates the picking stick 66 at the left, but there is a miss because the shuttle is not in the left hand box and cannot be thrown.

Thus by this procedure the required sequence in the preferred embodiment of two picks and two misses is obtained with very little departure from the standard Dobcross picking mechanism.

Figures 13 to 16 inclusive illustrate the changes required in order to apply the picking motion of the present invention to a Lansdowne loom.

The driving shaft 142, though positioned transversely to the bottom shaft 104 above referred to, moves at the same speed as the bottom shaft 104 and may be considered to be the equivalent thereof. The shaft 142 carries a crank 143, which operates a connecting rod 144 which extends horizontally across from one side to the other of the loom, and on each side of the loom operates an identical but opposite counterpart picking rocker 145 pivoted at 146 to rigid frame structure 147, and pivotally connected to the connecting rod 144 at 148. Each picking rocker 145 carries an adjustable picking abutment 149. The picking abutments 149 are continuously carried by the crank through an arc from one limiting position at the left of their stroke as shown in Figure 13 to the opposite limiting position somewhat less than 90° toward the right, as well known.

Loosely pivoted on the same shaft 146, behind the picking rocker in Figure 13, is an opposite counterpart picking arm 150 at each side of the mechanism, connected by a strap 151 extending through an opening in a spring support 152 to a spring abutment 152', which when pulled to the left in Figure 13 compresses a compression spring 153. The structure at the right, not shown in an opposite counterpart.

The picking arm 150 carries a picker strap 154, suitably of conventional type, which connects to a pivoted picker stick 66 of well known character.

The picking motion is determined by a gear 155 driven from a gear 156 on shaft 142, at one fourth the speed of shaft 142. Gear 155 is on shaft 157 carrying picking change cam 158. Bearings for the shaft are of any suitable character, not shown. The picking change cam 158 turns one-half revolution per cycle and has two high portions 159 each extending slightly over 45° and two low portions 160 each extending slightly over 45°, with suitable transition portions between. A follower lever 161 on fixed pivot 162 carries a follower 163 which engages the picking change cam, and is spring urged toward the cam by a spring 164 suitably of tension type connected to a spring abutment. The opposite end of the follower lever 161 is pivotally connected at 165 to a follower rod 166 illustrated more in detail in Figures 15 and 16, which connects to and operates a bell crank lever 167 pivoting at 168 on bearings not shown, and having at its opposite end a slot 169 engaging a pin 170 for moving in and out a sliding latch control bar 171 moving longitudinally in a latch 172 on a fixed pivot 173 in the frame structure, and spring urged toward latching position by a tension spring 174 from a suitable anchorage. The end 175 of the latch control bar 171 when in its lower position with respect to Figure 15 is engaged by the picking abutment 149 on the picking rocker 145 near the upper end of its stroke.

The latch 172 by its latching dog 176 engages a latching abutment 177 (Figure 15), on the picking arm 150, when the latch is in latching position, holding the picking arm against release of the pull of spring 153 and preventing throwing of the picker stick.

When the cam moves to a low, the latch control bar moves to lower position (Figures 13 to 16 inclusive) where it can be engaged by the picking abutment 149, the latch is opened, releasing the picking arm 150 and permitting spring 153 to throw the picker stick. In case cam 158 prevents the latch control bar from engagement by the picking abutment 149, the latch cannot be released and the picker stick cannot be thrown, so that there is a miss.

A projection at 178 from the back of the picking rocker 145 engages the picking arm 150 on the return stroke and returns the arm to the position shown in Figure 13, compressing the spring 153 and permitting the latch spring 174 to restore the latch to latching position, and holding the picking arm in this position until the latch is next released.

It will be evident of course that the picker stick and the picking mechanism on the right hand side of the loom will be opposite counterparts of those here shown at the left hand side of the loom, as indicated in Figure 16, where it is seen that the bell crank 167' is connected with its arm engaging follower rod extension 166' extending up rather than down, and the arm engaging the latch control bar 171 oppositely directed from that on the left. Likewise the picking rockers, arms and latches are opposite so that the forward stroke on the left which creates a pick or a miss pick corresponds to the return stroke on the right, and vice versa.

To summarize the operation of the form of Figures 13 to 16 inclusive, in the first step corresponding to Figure 1, with the shuttle in the right hand box, the cam follower 163 has just begun to arrive at a radial inner or "low" portion 160 of the picking change cam 158, moving the picking latch control bars 171 at both sides of the loom into the picking position where they can be intercepted by the picking abutment 149. However, the picking rocker 145 on the right is then moving toward the position for engagement between the abutment 149 and the end 175 of the latch control bar, while on the left the picking rocker 145 is on its return or inoperative stroke. Therefore, on the right the picking abutment 149 engages the latch control bar, releasing the latch and permitting the spring 153 to throw over the picking arm 150, which in turn pulls the picker strap 154 and the picker stick and throws the shuttle from right to left.

In the next step as shown in Figure 2, the follower 163 is still on a radial inner or low portion 160 of the picking change cam 158, the shuttle is in the left hand box and the picking rocker at the left is in its operative stroke. Therefore at the left the picking abutment 149 strikes the end 175 of the latch control bar, releases the latch, and permits the spring 153 to throw over the picking arm 150, the picker strap 154 and the picker stick 66, throwing the shuttle from left to right. No operation occurs on the right because the shuttle is not in the right hand box and the picking rocker 145 on the right is on its return stroke.

In the third step corresponding to Figure 3, the cam follower 163 has arrived at a high or radially outer portion 159 of the picking change cam 158, moving the latch control bars 171 to the upper or miss position, so that, while the picking rocker 145 on the right makes a stroke in the operative direction, the picking abutment 149 does not encounter the picking control bar, the latch is not released and the shuttle is not thrown. Over at the left the picking rocker 145 is making its return stroke.

In the fourth step of the cycle as shown in Figure 4, the follower 163 is near the end of a radially outer portion 159 of the picking change cam 158, so that the latch control bars 171 are still set for a miss. The picking rocker 145 on the right is on its return stroke, but the picking rocker at the left is on its operative or forward stroke, but accomplishes nothing due to the fact that the picking abutment 149 does not encounter the picking control bar 171. In any case there could be no picking from the left, as the shuttle is in the right hand box, but the shifting of the picking control bar at the left in this case prevents throwing the picker stick in the absence of the shuttle, which in the case of the heavier mechanism of Figures 13 to 16 might cause some damage to the equipment.

The only other change which normally would be encountered in a loom to produce the special weave under discussion would be the change in the take-up speed to make it accommodate the rate of production of the fabric which is half the normal take-up speed, due to the two mispicks. This feature is obviously merely a matter of choosing suitable gear ratios.

In Figures 17 and 18, I illustrate suitable conventional wires, of which Figure 17 shows a cutting wire 179 having a cutting portion 180 and a wire portion 181 which is desirably a high wire capable of producing a high loop. The wire 182 of Figure 18 is normally a low wire and a non-cutting wire. The result of using the wire of Figure 17 for producing the high loops and the wire of Figure 18 for producing the low loops is that in the fabric of Figure 9 the areas 61 will not only be different in appearance because they contain cut pile but also because they are higher than the uncut pile in area 60. The net result is that a mosaic effect is produced entirely independent of any differences in pattern color, and this effect may be accentuated and rendered more artistic by choosing pattern colors which will function in harmony with the weave. Thus the textile designer is given a new tool in design to combine with the previously used feature of color contrast, without paying the penalty previously exacted of relatively greater material consumption and disadvantageous location of the respective contrasting tufts in different transverse rows of tufts. Accordingly, the present invention makes possible production of an improved fabric on which infinite variation is possible due to the ability to employ variantly the features of cut and uncut loops and high and low loops, as well as the normal color contrast in the pattern.

Thus it is possible to get an additional color combination without adding additional pile yarn, for example by using a given pile warp at one point in the design as an uncut loop and at another point in the design as a cut loop. This is illustrated diagrammatically in Figure 19, in which it will be evident that the same pile yarn 183 is employed as a cut tuft at 184 due to the fact that it has been raised over a cutting wire, whereas at other points in the same fabric this is used as an uncut loop 185 due to the fact that it has been raised over a non-cutting wire.

This effect is both novel and unusual due to the fact that the cut ends of the pile have a distinctly different color effect from that given by a mass of loops of the same pile.

In Figure 8 I show a fabric having cut high pile and uncut low pile in the same transverse row of tufts. The features of cut and uncut piles and high and low piles in the same transverse row of tufts may be combined in many variations. Thus in Figure 20 I show uncut high pile 186 and uncut low pile 187, which, as the pattern may provide, will come in the same transverse row of tufts. Figure 21 shows uncut high pile 188 and cut low pile 189, which in this fabric will come in the same transverse row of tufts. In Figure 22 cut high pile 190 and cut low pile 191 are provided, and these can come in the same transverse row of tufts in the fabric. In all of these figures, the high and low pile, or cut and uncut pile of different transverse rows, while permissibly made from the same pile warp, are preferably made from different pile warps, as shown.

Reference is made herein to a cycle as comprising four steps, notwithstanding that the chain warps are reversed at the end of four steps, and do not reach the initial position until eight steps have taken place.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. A loom having picker sticks on the opposite sides for throwing the shuttle, in combination with means operative repetitively on each cycle at one side of the loom to prevent throwing of the picker stick on that side when the shuttle is at that side of the loom, means operative repetitively on each cycle at the other side of the loom for throwing the picker stick at the other side when the shuttle is not at that side and thus causing a mispick, a wire, means for raising a pile over the wire opposite a mispick while the chain warps remain in the position of the next preceding pick and means for moving the pile opposite the mispick to the position of the next preceding weft.

2. A loom having picking mechanism including picker sticks, means operative repetitively on each cycle for throwing the picker stick on one side of the loom when the shuttle is not at that side of the loom while avoiding throwing the picker stick at the other side of the loom, thereby causing a mispick, a wire, means for raising a pile over the wire opposite a mispick while the chain warps remain in the position of the next preceding pick, and means for moving the pile opposite the mispick to the position of the next preceding weft.

3. A loom having picking mechanism including picker sticks on the opposite sides, pivotally mounted opposite picking rockers, located on the opposite sides of the loom, means for oppositely moving the picking rockers, opposite picking arms pivoted on the axes of the picking rockers, operatively connected to the picker sticks and retracted by the picking rockers, spring means for throwing the picking arms and the picker sticks, and latch means for holding the picking arms and the spring means against release, in combination with a picking change cam, means for turning the picking change cam, and means controlled by the picking change cam for releasing the latch means selectively under action of the appropriate picking rocker.

4. A loom having picking mechanism including picker sticks at the opposite sides, pivotally mounted opposite picking rockers, located on the opposite sides of the loom, means for oppositely moving the picking rockers, opposite picking arms pivoted on the axes of the picking rockers, operatively connected to the picker sticks and retracted by the picking rockers, spring means for throwing the picking arms and picker sticks and latch means for holding the picking arms and the spring means against release, in combination with a picking change cam, means for rotating the cam, latch control bars supported in the latch means and movable into a position to release the appropriate latch when engaged by the appropriate picking rocker and means for moving the latch control bars out of engagement by the picking rockers in response to the control of the picking change cam.

5. In a loom, a picking mechanism comprising opposite counterpart pivotal picking rockers on the two sides of the loom having picking abutments and return abutments, means for moving the picking rockers back and forth between their limiting positions, with the rocker on one side making its forward stroke while the rocker on the other side makes its return stroke, picking arms oppositely pivotally mounted on the two sides on the axes of the picking rockers returned by the return abutments, pivotal opposite picker sticks on the two sides, means for operatively interconnecting the picker sticks with the picking arms, spring means for urging the picking arms in the direction to throw the picker sticks oppositely, latches for engaging and holding the picking arms in position for compression of the spring means, latch control bars in the latches and slidable with respect thereto, adapted in one position to engage the picking abutments on the picking rockers and release the appropriate latch, a picking change cam, means for driving the same, and follower means interconnecting the latch control bars with the picking change cam and moving the latch control bars selectively into position to release the appropriate latch or into position to mispick.

6. In a loom, means for interweaving chain warps and pile warps with wefts to produce a pile fabric, in combination with a lay, picking mechanism including picker sticks for throwing a pair of picks and interspersing them with a pair of mispicks accompanied by beats at longitudinally displaced successive positions on each weaving cycle, low and high wires, means for inserting a low wire and a high wire longitudinally displaced side by side on each cycle and means for selectively raising pile over the low wire or the high wire as the pattern requires.

7. In a loom, means for interweaving chain warps and pile warps with wefts to produce a pile fabric in combination with a lay, picking mechanism including picker sticks for producing a pair of picks and interspersing the pair of picks with a pair of mispicks accompanied by beats at successive longitudinally displaced positions on each weaving cycle, low non-cut and high cut wires, means for inserting a low non-cut wire followed by a high cut wire longitudinally displaced side by side on each cycle and means for selectively raising pile over low wire or high wire as the pattern requires.

JOHN HENRY HARDING,
*Generally known as Harry J. Harding.*

REFERENCES CITED

The following references are of record in the file of this patent:

UNITED STATES PATENTS

| Number | Name | Date |
|---|---|---|
| 440,592 | Harrison | Nov. 11, 1890 |
| 840,257 | Sarafian | Jan. 1, 1907 |
| 913,301 | McGuiness | Feb. 23, 1909 |
| 1,171,249 | Reynolds | Feb. 8, 1916 |
| 1,651,338 | Brown | Nov. 29, 1927 |
| 2,141,152 | Kaufman | Dec. 20, 1938 |
| 2,355,540 | Layton | Aug. 8, 1944 |